(12) United States Patent
Gajula et al.

(10) Patent No.: US 12,267,794 B2
(45) Date of Patent: Apr. 1, 2025

(54) OBTAINING A PLURALITY OF MEASUREMENTS ASSOCIATED WITH A PLURALITY OF SYMBOLS OF A SYNCHRONIZATION SIGNAL BLOCK

(71) Applicant: QUALCOMM Incorporated, San Diego, CA (US)

(72) Inventors: Nagaraju Gajula, San Diego, CA (US); Yong Li, San Diego, CA (US); Kang Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 17/823,815

(22) Filed: Aug. 31, 2022

(65) Prior Publication Data

US 2024/0073835 A1 Feb. 29, 2024

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01)

(58) Field of Classification Search
CPC .................... H04W 56/001; H04W 24/10
See application file for complete search history.

(56) References Cited

U.S. PATENT DOCUMENTS

2021/0368459 A1* 11/2021 Zhang .................. H04L 5/0048
2024/0422604 A1* 12/2024 Zhang .................. H04W 24/10

* cited by examiner

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may receive a synchronization signal block (SSB) comprising a plurality of symbols. The UE may obtain, during a plurality of measurement windows, a plurality of measurements associated with a beam group of a plurality of reception beams corresponding to a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The UE may perform a wireless communication task based on the plurality of measurements. Numerous other aspects are described.

30 Claims, 13 Drawing Sheets

OBTAINING A PLURALITY OF MEASUREMENTS ASSOCIATED WITH A PLURALITY OF SYMBOLS OF A SYNCHRONIZATION SIGNAL BLOCK

FIELD OF THE DISCLOSURE

Aspects of the present disclosure generally relate to wireless communication and to techniques and apparatuses for obtaining a plurality of measurements associated with a plurality of symbols of a synchronization signal block.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive a synchronization signal block (SSB) comprising a plurality of symbols. The one or more processors may be configured to obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The one or more processors may be configured to perform a wireless communication task based on the plurality of measurements.

Some aspects described herein relate to an apparatus for wireless communication at a UE. The apparatus may include a memory and one or more processors coupled to the memory. The one or more processors may be configured to receive SSB comprising a plurality of symbols. The one or more processors may be configured to obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a primary synchronization signal symbol (PSS). The one or more processors may be configured to perform a wireless communication task based on the plurality of measurements.

Some aspects described herein relate to a method of wireless communication performed by an apparatus at a UE. The method may include receiving SSB comprising a plurality of symbols. The method may include obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The method may include performing a wireless communication task based on the plurality of measurements.

Some aspects described herein relate to a method of wireless communication performed by an apparatus at a UE. The method may include receiving SSB comprising a plurality of symbols. The method may include obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS. The method may include performing a wireless communication task based on the plurality of measurements.

Some aspects described herein relate to a non-transitory computer-readable medium that stores a set of instructions for wireless communication by a UE. The set of instructions, when executed by one or more processors of the UE, may cause the UE to receive SSB comprising a plurality of symbols. The set of instructions, when executed by one or more processors of the UE, may cause the UE to obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The set of instructions, when executed by one or more processors of the UE, may cause the UE to perform a wireless communication task based on the plurality of measurements.

Some aspects described herein relate to a non-transitory computer-readable medium that stores a set of instructions for wireless communication by a UE. The set of instructions, when executed by one or more processors of the UE, may cause the UE to receive SSB comprising a plurality of symbols. The set of instructions, when executed by one or more processors of the UE, may cause the UE to obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS. The set of instructions, when executed by one or more processors of the UE, may cause the UE to perform a wireless communication task based on the plurality of measurements.

Some aspects described herein relate to an apparatus for wireless communication. The apparatus may include means for receiving SSB comprising a plurality of symbols. The apparatus may include means for obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The apparatus may include means for performing a wireless communication task based on the plurality of measurements.

Some aspects described herein relate to an apparatus for wireless communication. The apparatus may include means for receiving SSB comprising a plurality of symbols. The apparatus may include means for obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS. The apparatus may include means for performing a wireless communication task based on the plurality of measurements.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
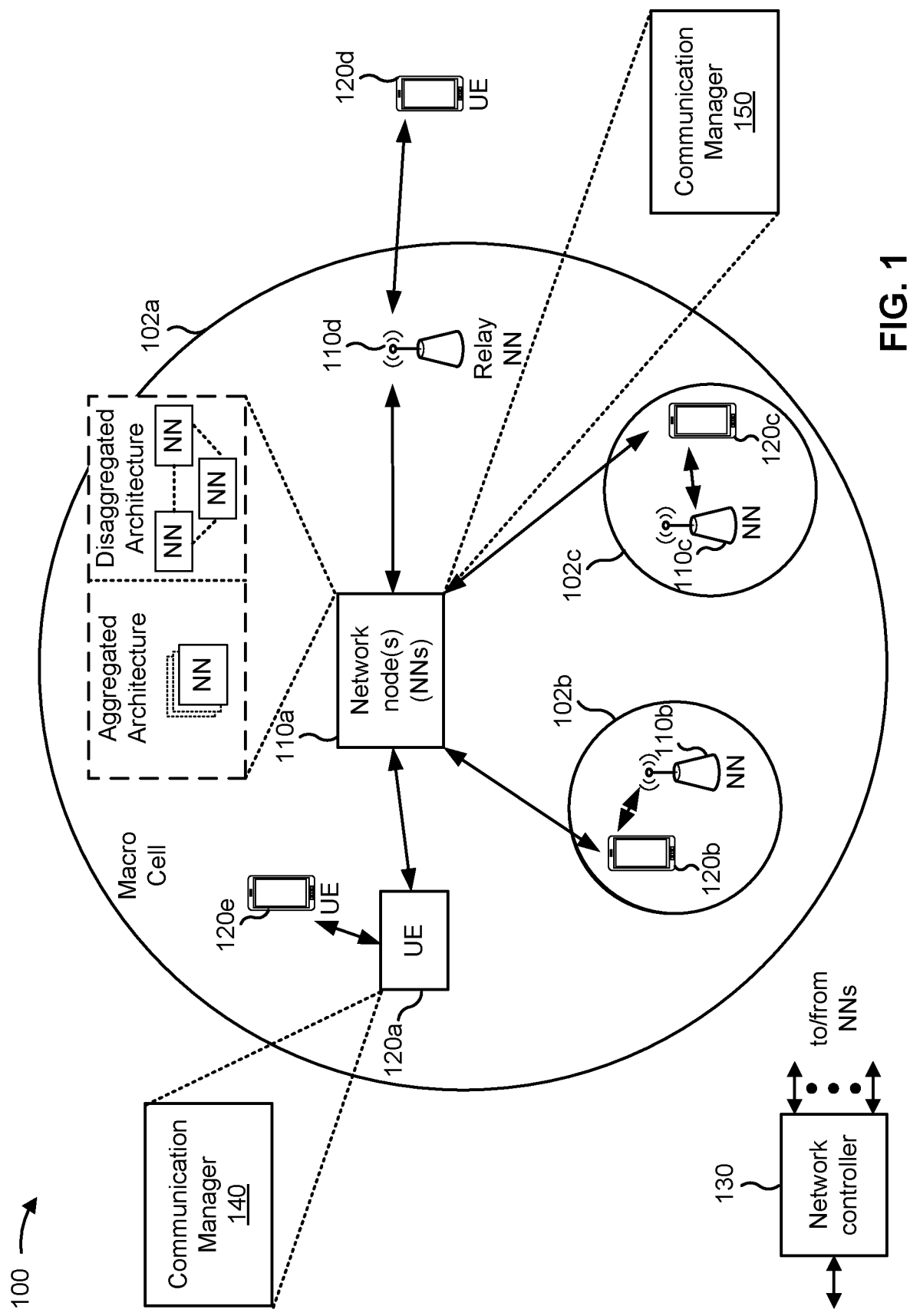
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) comprising a plurality of symbols; obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB; and perform a wireless communication task based on the plurality of measurements. Additionally, or alternatively, the communication manager 140 may perform one or more other operations described herein.

In some aspects, the communication manager 140 may receive an SSB comprising a plurality of symbols; obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a primary synchronization signal symbol (PSS); and perform a wireless communication task based on the plurality of measurements. Additionally, or alternatively, the communication manager 140 may perform one or more other operations described herein.

As indicated above, FIG. 1 is provided as an example. Other examples may differ from what is described with regard to FIG. 1.

Figure 2:
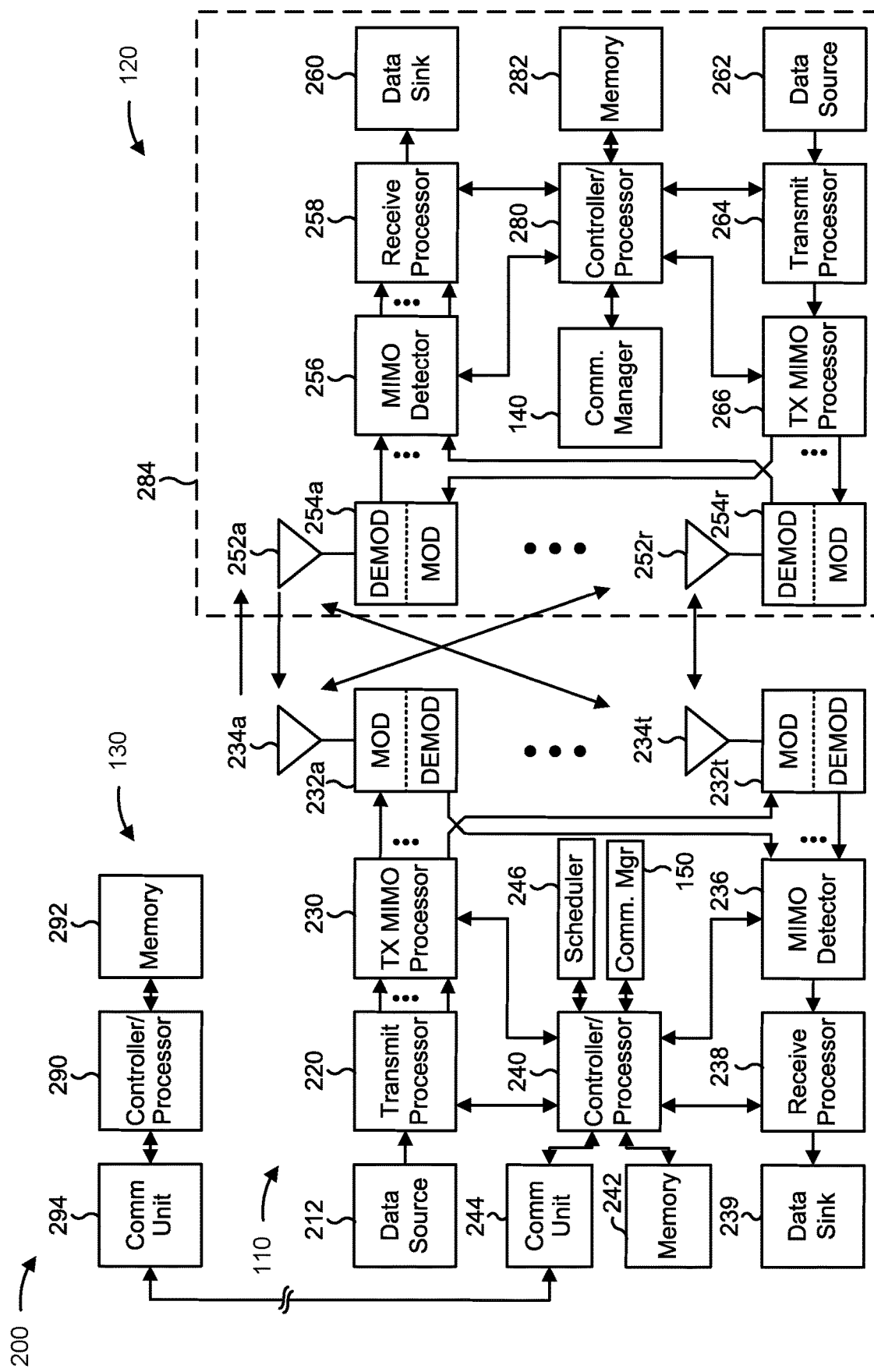
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a PSS or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with obtaining a plurality of measurements associated with a plurality of symbols of an SSB, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving an SSB comprising a plurality of symbols; means for obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB; and/or means for performing a wireless communication task based on the plurality of measurements.

In some aspects, the UE includes means for receiving an SSB comprising a plurality of symbols; means for obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS; and/or means for performing a wireless communication task based on the plurality of measurements. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
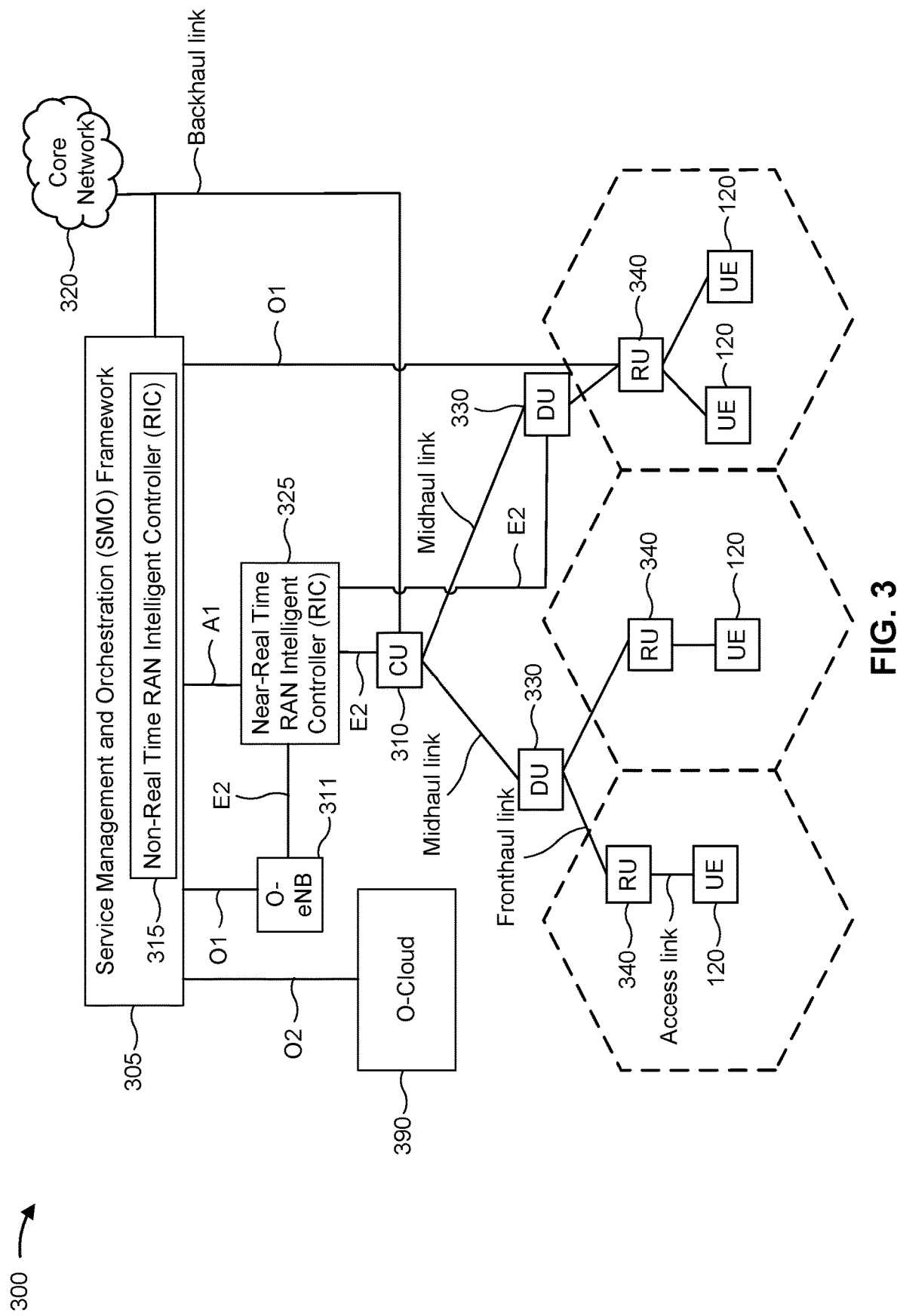
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
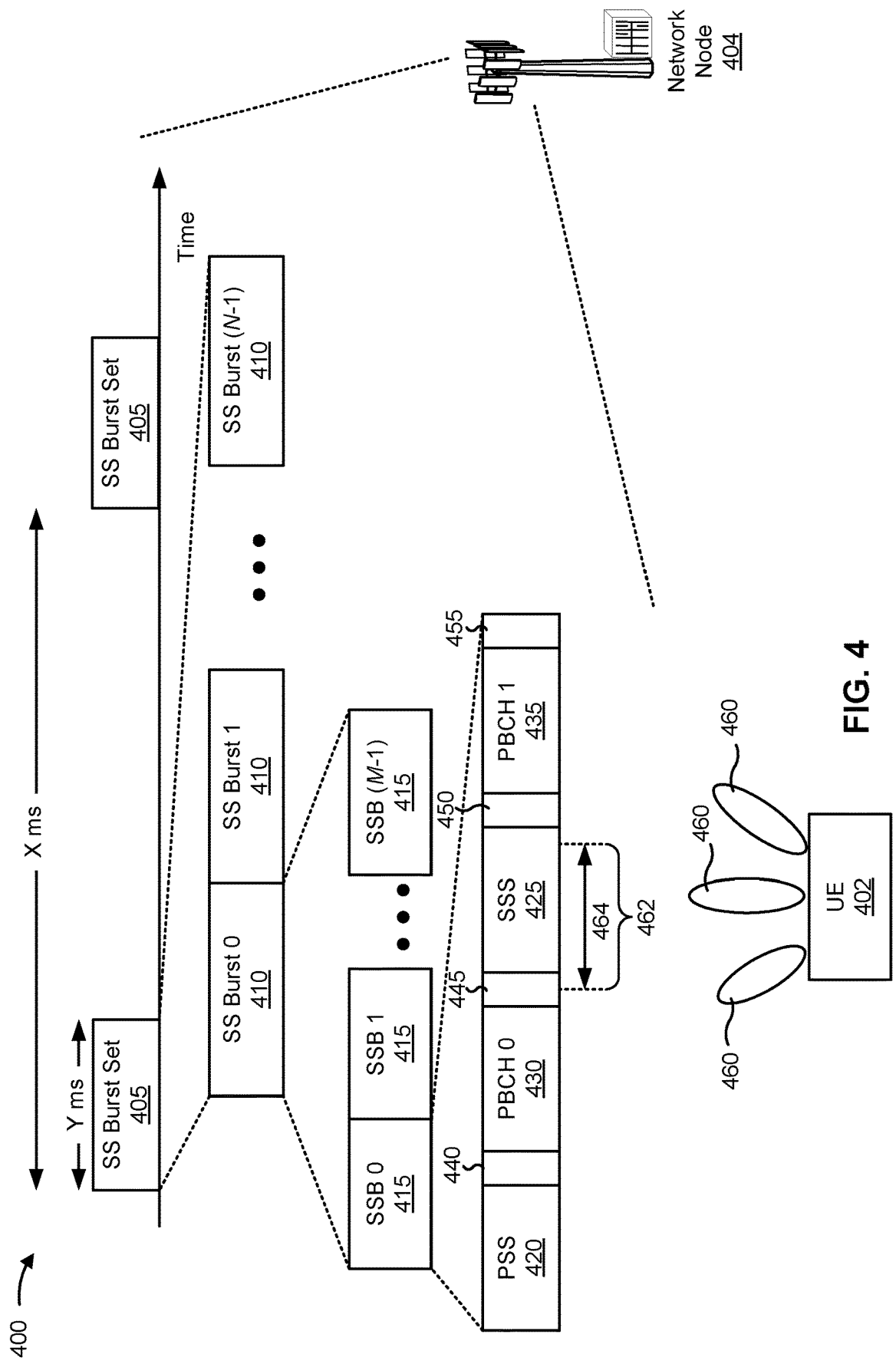
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH), which may be transmitted as a first PBCH (shown as "PBCH 0") 430 and a second PBCH (shown as "PBCH 1") 435. As shown, a cyclic prefix (CP) gap 440 may be disposed between the PSS 420 and the PBCH 0 430, a CP gap 445 may be disposed between the PBCH 0 430 and the SSS 425, a CP gap 450 may be disposed between the SSS 425 and the PBCH 1 435, and a CP gap 455 may be disposed between the PBCH 1 and a next SSB (e.g., SSB 1 415). In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

In some cases, an SSB 415 can be used to facilitate a beam refinement operation and/or other beam management operation. For example, an SSB-based measurement can be obtained by the UE 402 associated with one or more UE beams 460 within a measurement window 462. The measurement window 462 can have a window size 464 equal to a width of a symbol. The measurement can include an RSRP measurement, an RSRQ measurement, and/or a signal-to-noise ratio (SNR). In some cases, the SSB-measurement is done only on SSS 425 symbol. In some cases, the UE 402 can be configured to obtain a measurement corresponding to only one UE beam 460 associated with one SSB in an SSB occasion. The UE 402 can obtain measurements in multiple SSB occasions, thereby sweeping through a number of beams.

In some cases, the beam refinement operation can be performed more efficiently by performing measurements associated with more than one beam per SSB. For example, the UE can utilize the PBCH symbols for measurement, thereby performing two measurements per SSB. In some cases, to perform beam refinement, reception beams can be grouped into two beam groups. A first group (Group 1) may include beams associated with a serving cell only and a second group (Group 2) may include beams associated with a serving cell and a neighbor cell or a neighbor cell only.

To perform PBCH-based measurement, the UE can loop through the beams of Group 1. For example, Group 1 can include a set (Group 1A) of beams for which a timing difference is less than +/−CP/2 and a set (Group 1B) of beams for which the timing difference is greater than +/−CP/2 and less than CP. The timing difference can be referred to as a "timing offset with respect to serving cell beam timing" and is a difference between an SSB timing of reception beams and a serving cell reception beam timing. The beams of Group 1A can be used for obtaining measurements associated with multiple symbols of an SSB. Each beam may be configured to obtain a measurement within the measurement window 462. The measurement window 462 can have a window size 464 equal to a width of a symbol.

For example, Group 1 may include beams A, B, C, D, E, F, and G. If beams A, D, and F are in Group 1A, then beams A, D, and F may be used to obtain measurements associated with three symbols of an SSB (e.g., two PBCH symbols and an SSS symbol). Scheduling three beams to be used for measurement associated with an SSB may be referred to as 3× scheduling, scheduling two beams to be used for measurement associated with an SSB may be referred to as 2× scheduling, and scheduling one beam to be used for measurement associated with an SSB may be referred to as 1× scheduling. Since beams B, C, E, and G are not within Group 1A, they may not be used for 3× scheduling. Beam refinement may be more efficient if additional beams may be used for 3× scheduling. However, as shown in FIG. 4, for example, a beam 460 timing (and therefore the measurement window 462) associated with the SSS symbol 425 can be shifted to the left with respect to the SSS symbol 425 by CP/2 as a result of a timing difference between the beam 460 and the SSB 415. If a beam 460 also is used to obtain a measurement associated with the PBCH 0 symbol 430 with a measurement window having the width 464, the measurement window may overlap with the measurement window 462, leading to potentially inaccurate measurements.

Some aspects of the techniques and apparatuses described herein may include obtaining a plurality of measurements associated with an SSB by using a reduced measurement window size to facilitate 2× and/or 3× scheduling of reception beams. In some aspects, for example, a UE may receive an SSB and obtaining, during a plurality of measurement windows, a plurality of measurements associated with a beam group of a plurality of reception beams. Each beam of the plurality of reception beams may correspond to a symbol of the SSB. The beam group may be associated with a serving cell and may include a first set of beams and a second set of beams. Each beam of the beam group may correspond to a measurement window having a window size that is less than a size of a corresponding symbol of the plurality of symbols of the SSB. The UE may perform a wireless communication task based on the plurality of measurements.

For example, in some aspects, Group 1A may be divided into a first set (Group 1A_1) and a second set (Group 1A_2). Beams associated with Group 1A_1 may include beams associated with a timing difference within +/−CP/2 and Group 1A_2 reception beams may include beams previously classified as Group 1B beams—e.g., beams associated with a timing difference that is greater than +/−CP/2 but less than +/−CP. Group 1B may be divided into a first set (Group 1B_L) and a second set (Group 1B_R). Beams associated with Group 1B_L may be associated with a timing difference of less than −CP (e.g., due to a shift to the left of less than −CP) and beams associated with Group 1B_R may be associated with a timing difference of greater than +CP (e.g., due to a shift to the right of greater than +CP).

Reducing the measurement window size may facilitate using more beams for 2× and/or 3× scheduling (e.g., by subdividing Group 1A and Group 1B), thereby increasing the efficiency of obtaining SSB-based measurements. In this way, some aspects may increase the efficiency of SSB-based beam refinement, thereby having a positive impact on network performance.

As indicated above, FIG. 4 is provided as an example. Other examples may differ from what is described with regard to FIG. 4.

Figure 5:
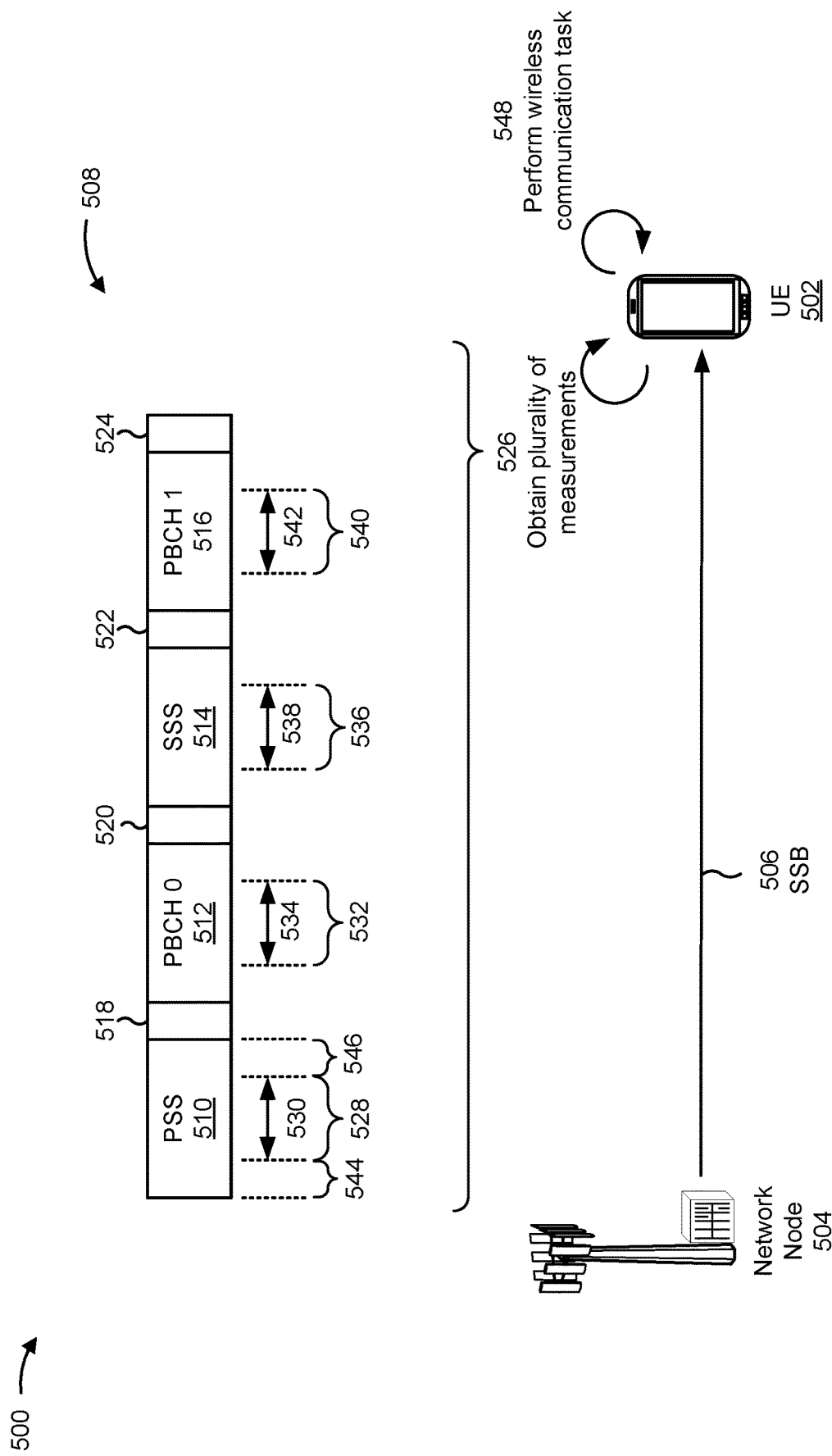
FIG. 5 is a diagram illustrating an example associated with obtaining a plurality of measurements associated with a plurality of symbols of a synchronization signal block (SSB), in accordance with the present disclosure.

FIG. 5 is a diagram illustrating an example 500 associated with obtaining a plurality of measurements associated with a plurality of symbols of an SSB, in accordance with the present disclosure. As shown in FIG. 5, a UE 502 and a network node 504 may communicate with one another. The UE 502 may be, be similar to, include, or be included in, the UE 402 depicted in FIG. 4 and/or the UE 120 depicted in FIGS. 1 and 2. The network node 504 may be, be similar to, include, or be included in, the network node 404 depicted in FIG. 4, one or more components of the disaggregated base station architecture 300 depicted in FIG. 3, and/or the network node 110 depicted in FIGS. 1 and 2.

As shown by reference number 506, the network node 504 may transmit, and the UE 502 may receive an SSB 508. The SSB 508 may include a plurality of symbols. For example, as shown, the SSB 508 may include a PSS symbol 510, a PBCH 0 symbol 512, an SSS symbol 514, and a PBCH 1 symbol 516. A gap 518 having a width equal to a CP may be disposed between the PSS symbol 510 and the PBCH 0 symbol 512, a gap 520 having a width equal to a CP may be disposed between the PBCH 0 symbol 512 and the SSS symbol 514, a gap 522 having a width equal to a CP may be disposed between the SSS symbol 514 and the PBCH 1 symbol 516, and a gap 524 having a width equal to a CP may be disposed between the PBCH 1 symbol 516 and a next SSB (not shown).

As shown by reference number 526, the UE 502 may obtain a plurality of measurements. For example, the UE 502 may obtain, during a plurality of measurement windows, a plurality of measurements associated with a beam group of a plurality of reception beams. Each beam of the plurality of reception beams may correspond to a symbol of the SSB 508. The beam group (e.g., a group 1) may be associated with a serving cell and may include a first set (e.g., a group 1A_1) of beams and a second set (e.g., a group 1A_2) of beams. Each beam of the beam group may correspond to a measurement window having a window size that is less than a size of a corresponding symbol. For example, as shown, a measurement window 528 may include a window size 530 that is less than a size of the PSS symbol 510, a measurement window 532 may include a window size 534 that is less than the size of the PBCH 0 symbol 512, a measurement window 536 may include a window size 538 that is less than a size of the SSS symbol 514, and a measurement window 540 may include a window size 542 that is less than a size of the PBCH 1 symbol 516.

In some aspects, the first set of beams may correspond to a first measurement window size and the second set of beams may correspond to a second measurement window size. In some aspects, the first and/or second measurement window size may correspond to a first timing difference (e.g., the illustrated timing difference 544) between a start of a measurement window and a start of a corresponding symbol and a second timing difference (e.g., the illustrated timing difference 546) between an end of the measurement window and an end of the corresponding symbol. The first timing difference may be equal to the second timing difference, and the first timing difference may be no greater than one half of a CP length. In some aspects, the second measurement window size may correspond to a timing difference that is greater than one half of a CP length and less than a CP length. In some aspects, the UE 502 may obtain three measurements associated with the SSB 508 using 3× scheduling. Each measurement may correspond to a beam of the beam group. In some aspects, for example, the three measurements may correspond to three of the PSS 510, the PBCH 0 512, the SSS 514, or the PBCH 1 516.

In some aspects, the beam group may include a third set of beams (e.g., group 1B_L) and a fourth set of beams (e.g., group 1B_R). The third set of beams may correspond to a third measurement window size and the fourth set of beams may correspond to a fourth measurement window size. For example, the third measurement window size may correspond to a first timing difference between a start of a measurement window and a start of a corresponding symbol and a second timing difference between an end of the measurement window and an end of the corresponding symbol. The first timing difference may be different from the second timing difference, and the first timing difference is less than one half of a CP length. The second timing difference may be greater than one half of a CP length, equal to one half of a CP length and/or equal to zero, among other examples. The fourth measurement window size may correspond to a first timing difference between a start of a measurement window and a start of a corresponding symbol and a second timing difference between an end of the measurement window and an end of the corresponding symbol. The first timing difference may be different from the second timing difference and the first timing difference may be greater than one half of a cyclic prefix length. The second timing difference may be less than one half of a CP length, equal to one half of a CP length and/or equal to zero, among other examples.

In some aspects, the UE 502 may obtain at least two measurements associated with the SSB 508 using 2× scheduling. The at least two measurements may be associated with at least two of the PBCH 0 symbol 512, the SSS symbol 514, or the PBCH 1 symbol 516.

As shown by reference number 548, the UE 502 may perform a wireless communication task. The UE 502 may perform the communication task based on the plurality of measurements obtained in connection with the SSB 508. For example, the UE 502 may perform an SSB-based beam refinement operation to select a reception beam for receiving communications from the network node 504.

As indicated above, FIG. 5 is provided as an example. Other examples may differ from what is described with respect to FIG. 5.

Figure 6:
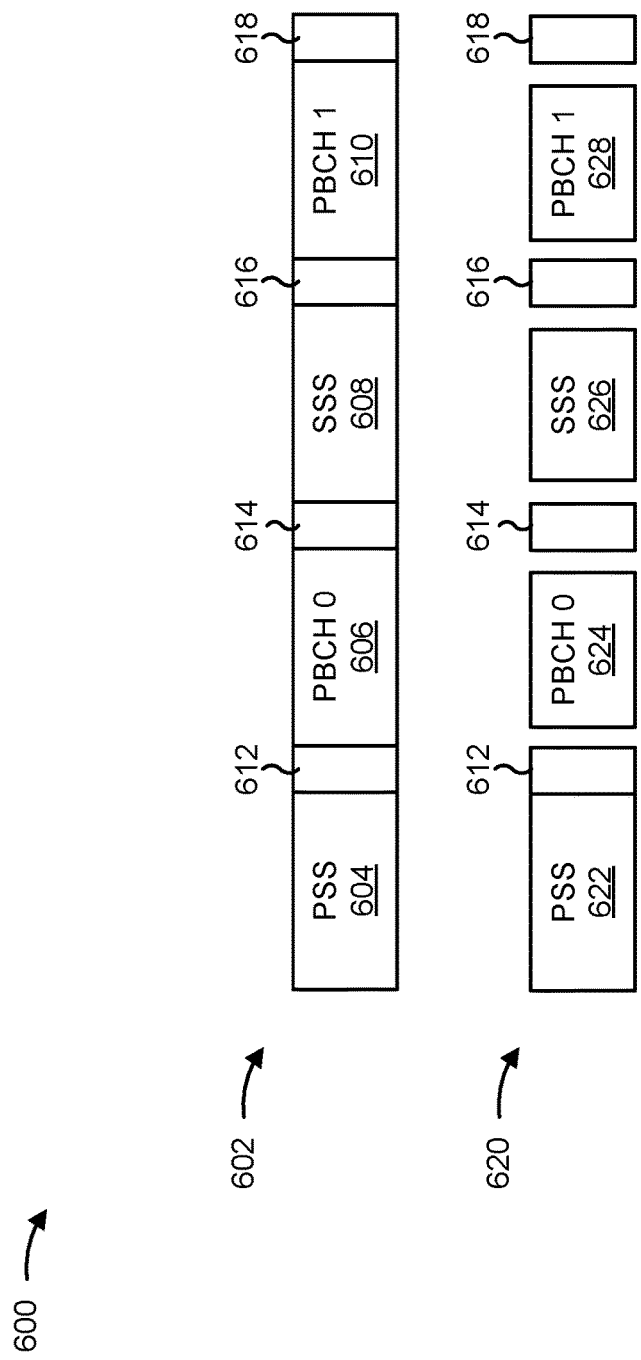
FIG. 6 is a diagram illustrating another example associated with obtaining a plurality of measurements associated with a plurality of symbols of an SSB, in accordance with the present disclosure.

FIG. 6 is a diagram illustrating another example 600 associated with obtaining a plurality of measurements associated with a plurality of symbols of an SSB 602, in accordance with the present disclosure. As shown, the SSB 602 may include a PSS symbol 604, a PBCH 0 symbol 606, an SSS symbol 608, and a PBCH 1 symbol 610. A gap 612 having a width equal to a CP may be disposed between the PSS symbol 604 and the PBCH 0 symbol 606, a gap 614 having a width equal to a CP may be disposed between the PBCH 0 symbol 606 and the SSS symbol 608, a gap 616 having a width equal to a CP may be disposed between the SSS symbol 608 and the PBCH 1 symbol 610, and a gap 618 having a width equal to a CP may be disposed between the PBCH 1 symbol 610 and a next SSB (not shown).

As shown by the schematic representation 620, using a reduced measurement window size may result in measurements (e.g., using group 1A_1 and/or 1A_2 beams) may be associated with smaller effective symbols (e.g., the extent of the symbol from which samples are extracted for measurement). Though the effective PSS symbol 622 may be the same size as the PSS symbol 604, the effective PBCH 0 symbol 624 may be smaller than the PBCH 0 606 symbol (e.g., by at least one half of a CP length on both sides), the effective SSS symbol 626 may be smaller than the SSS symbol 608 (e.g., by at least one half of a CP length on both sides), and the effective PBCH 1 symbol 628 may be smaller than the PBCH 1 symbol 610.

As indicated above, FIG. 6 is provided as an example. Other examples may differ from what is described with respect to FIG. 6.

Figure 7:
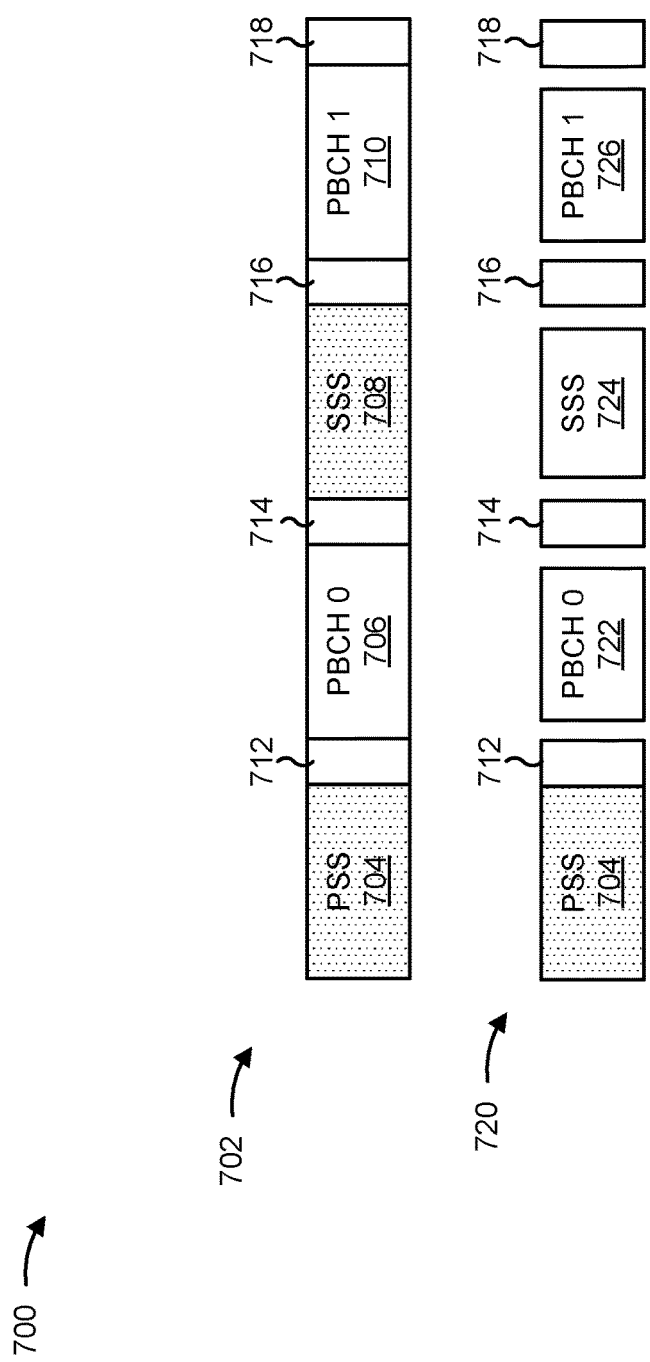
FIG. 7 is a diagram illustrating an example associated with obtaining a plurality of measurements associated with a plurality of symbols of an SSB, in accordance with the present disclosure.

FIG. 7 is a diagram illustrating an example 700 associated with obtaining a plurality of measurements associated with a plurality of symbols of an SSB 702, in accordance with the present disclosure. As shown, the SSB 702 may include a PSS symbol 704, a PBCH 0 symbol 706, an SSS symbol 708, and a PBCH 1 symbol 710. A gap 712 having a width equal to a CP may be disposed between the PSS symbol 704 and the PBCH 0 symbol 706, a gap 714 having a width equal to a CP may be disposed between the PBCH 0 symbol 706 and the SSS symbol 708, a gap 716 having a width equal to a CP may be disposed between the SSS symbol 708 and the PBCH 1 symbol 710, and a gap 718 having a width equal to a CP may be disposed between the PBCH 1 symbol 710 and a next SSB (not shown).

As shown by the schematic representation 720, using a reduced measurement window size may result in facilitating 3× scheduling of measurements using group 1B_L beams instead of 2× scheduling. Whereas, using 2× scheduling, obtaining measurements associated with the SSS symbol 708 can be problematic due to overlap of the measurement window associated with the SSS symbol 708 with the measurement window associated with the PBCH 0 symbol 706 (e.g., due to the measurement window being shifted left), using smaller effective symbols may minimize potential overlap. For example, the effective PBCH 0 symbol 722 may be smaller than the PBCH 0 symbol 706 (e.g., by at least one half of a CP length on both sides), the effective SSS symbol 724 may be smaller than the SSS symbol 708 (e.g., by at least one half of a CP length on both sides), and the effective PBCH 1 symbol 726 may be smaller than the PBCH 1 symbol 710. In this way, 3× scheduling may be used for group 1B_L beams, thereby increasing the number of measurements that may be obtained associated with an SSB 702.

As indicated above, FIG. 7 is provided as an example. Other examples may differ from what is described with respect to FIG. 7.

Figure 8:
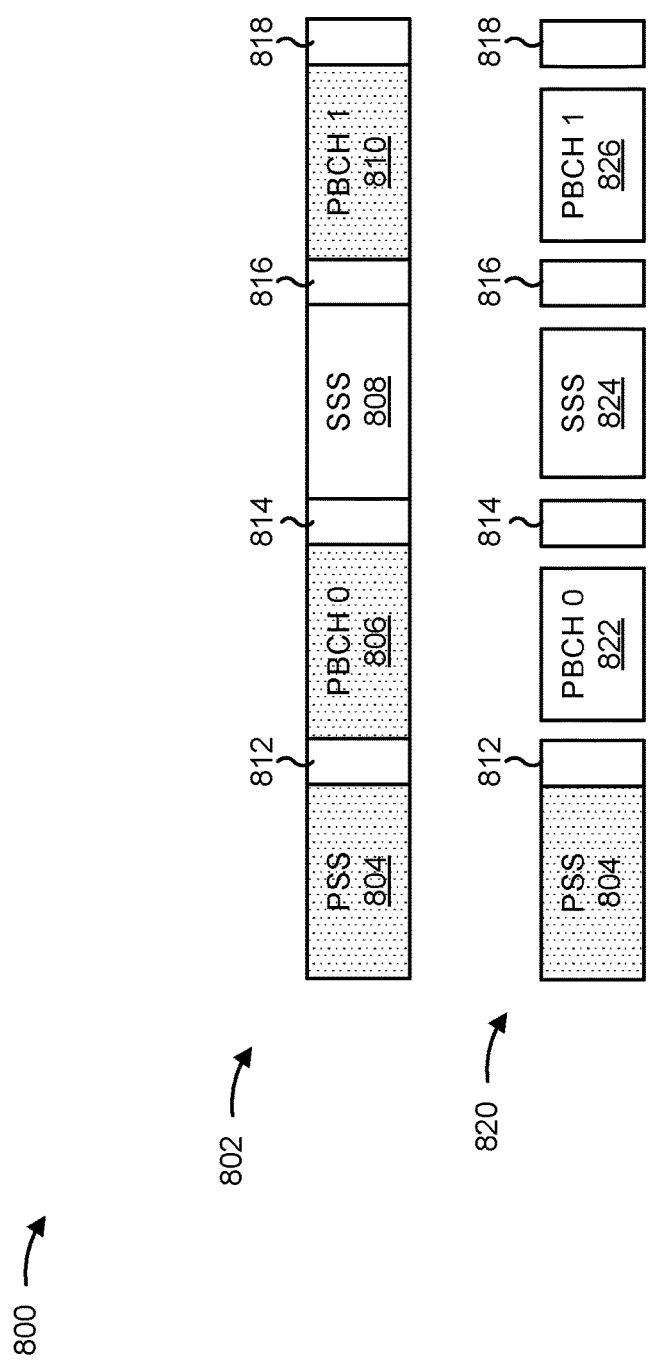
FIG. 8 is a diagram illustrating another example associated with obtaining a plurality of measurements associated with a plurality of symbols of an SSB, in accordance with the present disclosure.

FIG. 8 is a diagram illustrating another example 800 associated with obtaining a plurality of measurements associated with a plurality of symbols of an SSB 802, in accordance with the present disclosure. As shown, the SSB 802 may include a PSS symbol 804, a PBCH 0 symbol 806, an SSS symbol 808, and a PBCH 1 symbol 810. A gap 812 having a width equal to a CP may be disposed between the PSS symbol 804 and the PBCH 0 symbol 806, a gap 814 having a width equal to a CP may be disposed between the PBCH 0 symbol 806 and the SSS symbol 808, a gap 816 having a width equal to a CP may be disposed between the SSS symbol 808 and the PBCH 1 symbol 810, and a gap 818 having a width equal to a CP may be disposed between the PBCH 1 symbol 810 and a next SSB (not shown).

As shown by the schematic representation 820, using a reduced measurement window size may result in facilitating 2× or 3× scheduling of measurements using group 1B_R beams instead of 1× scheduling. For example, the effective PBCH 0 symbol 822 may be smaller than the PBCH 0 symbol 806 (e.g., by at least one half of a CP length on both sides), the effective SSS symbol 824 may be smaller than the SSS symbol 808 (e.g., by at least one half of a CP length on both sides), and the effective PBCH 1 symbol 826 may be smaller than the PBCH 1 symbol 810. In this way, 2× and/or 3× scheduling may be used for group 1B_R beams, thereby increasing the number of measurements that may be obtained associated with an SSB 802.

As indicated above, FIG. 8 is provided as an example. Other examples may differ from what is described with respect to FIG. 8.

In some aspects, 2× scheduling may be used for group 1B_R beams without reducing measurement window sizes by obtaining measurements associated with the PSS symbol or the PBCH 2 symbol in addition to the SSS symbol.

Figure 9:
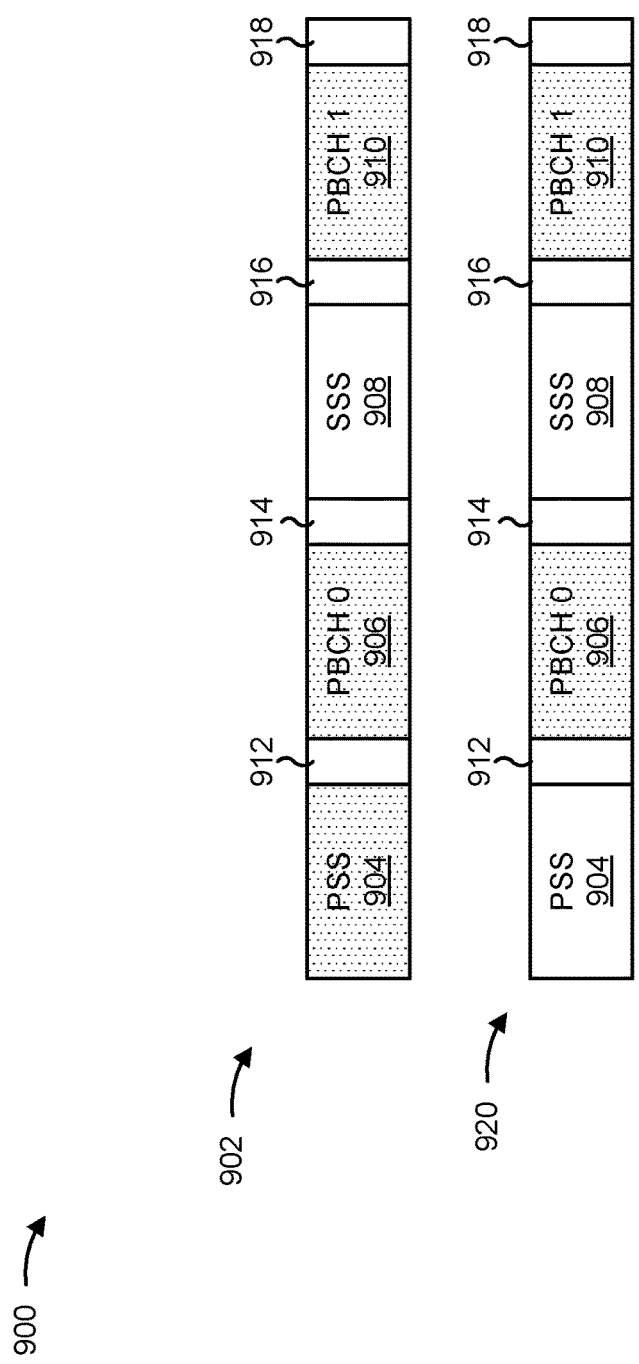

FIG. 9 is a diagram illustrating another example 900 associated with obtaining a plurality of measurements associated with a plurality of symbols of an SSB 902, in accordance with the present disclosure. As shown, the SSB 902 may include a PSS symbol 904, a PBCH 0 symbol 906, an SSS symbol 908, and a PBCH 1 symbol 910. A gap 912 having a width equal to a CP may be disposed between the PSS symbol 904 and the PBCH 0 symbol 906, a gap 914 having a width equal to a CP may be disposed between the PBCH 0 symbol 906 and the SSS symbol 908, a gap 916 having a width equal to a CP may be disposed between the SSS symbol 908 and the PBCH 1 symbol 910, and a gap 918 having a width equal to a CP may be disposed between the PBCH 1 symbol 910 and a next SSB (not shown).

In some aspects, while using 1× scheduling can facilitate obtaining measurements corresponding to only the SSS symbol 908, as shown by reference number 920, the UE may use 2× scheduling to obtain at least two measurements associated with the SSB 902. The at least two measurements may correspond to the PSS symbol 904 and the SSS symbol 908 or the PBCH 1 symbol 910.

As indicated above, FIG. 9 is provided as an example. Other examples may differ from what is described with respect to FIG. 9.

Figure 10:
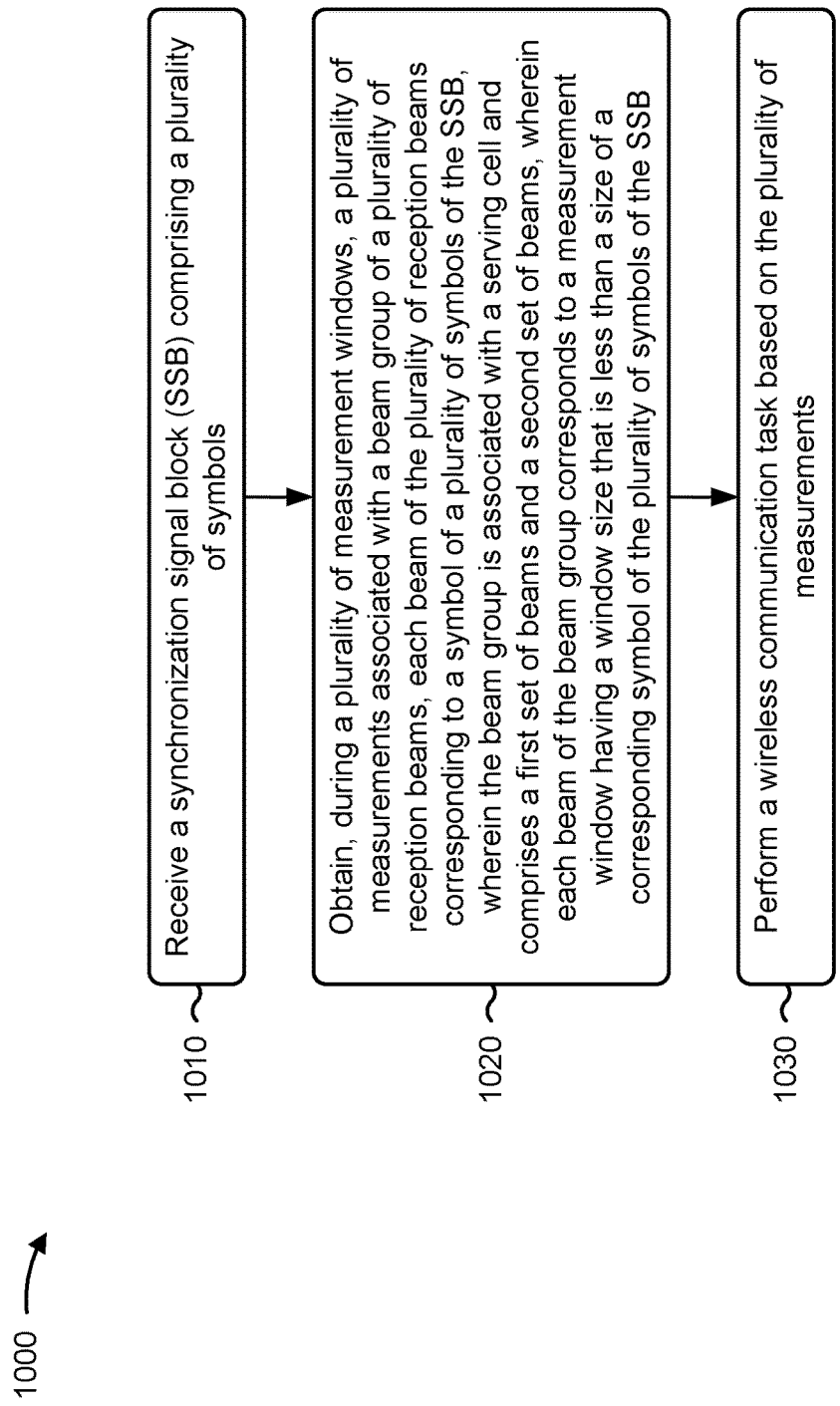
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 502) performs operations associated with obtaining a plurality of measurements associated with a plurality of symbols of an SSB.

As shown in FIG. 10, in some aspects, process 1000 may include receiving an SSB comprising a plurality of symbols (block 1010). For example, the UE (e.g., using communication manager 1208 and/or reception component 1202, depicted in FIG. 12) may receive an SSB comprising a plurality of symbols, as described above.

As further shown in FIG. 10, in some aspects, process 1000 may include obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB (block 1020). For example, the UE (e.g., using communication manager 1208 and/or reception component 1202, depicted in FIG. 12) may obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB, as described above.

As further shown in FIG. 10, in some aspects, process 1000 may include performing a wireless communication task based on the plurality of measurements (block 1030). For example, the UE (e.g., using communication manager 1208, reception component 1202, and/or transmission component 1204, depicted in FIG. 12) may perform a wireless communication task based on the plurality of measurements, as described above.

Process 1000 may include additional aspects, such as any single aspect or any combination of aspects described below and/or in connection with one or more other processes described elsewhere herein.

In a first aspect, the first set of beams corresponds to a first measurement window size and wherein the second set of beams corresponds to a second measurement window size. In a second aspect, alone or in combination with the first aspect, the first measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is no greater than one half of a cyclic prefix length. In a third aspect, alone or in combination with one or more of the first and second aspects, the second measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is greater than one half of a CP length and less than a CP length. In a fourth aspect, alone or in combination with one or more of the first through third aspects, obtaining the plurality of measurements comprises obtaining three measurements associated with the SSB, wherein each measurement of the three measurements corresponds to a beam of the beam group. In a fifth aspect, alone or in combination with one or more of the first through fourth aspects, the plurality of measurements correspond to at least three of a PSS symbol, a first PBCH symbol, an SSS symbol, or a second PBCH symbol.

In a sixth aspect, alone or in combination with one or more of the first through fifth aspects, the beam group comprises a third set of beams and a fourth set of beams, wherein the third set of beams corresponds to a third measurement window size and wherein the fourth set of beams corresponds to a fourth measurement window size. In a seventh aspect, alone or in combination with one or more of the first through sixth aspects, the third measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is less than one half of a cyclic prefix length. In an eighth aspect, alone or in combination with one or more of the first through seventh aspects, the fourth measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is greater than one half of a cyclic prefix length. In a ninth aspect, alone or in combination with one or more of the first through eighth aspects, obtaining the plurality of measurements comprises obtaining at least two measurements associated with the SSB, wherein each of the at least two measurements corresponds to a beam of the beam group. In a tenth aspect, alone or in combination with one or more of the first through ninth aspects, the plurality of measurements correspond to at least two of a first PBCH symbol, an SSS symbol, or a second PBCH symbol.

In an eleventh aspect, alone or in combination with one or more of the first through tenth aspects, performing the wireless communication task comprises performing an SSB-based beam refinement operation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
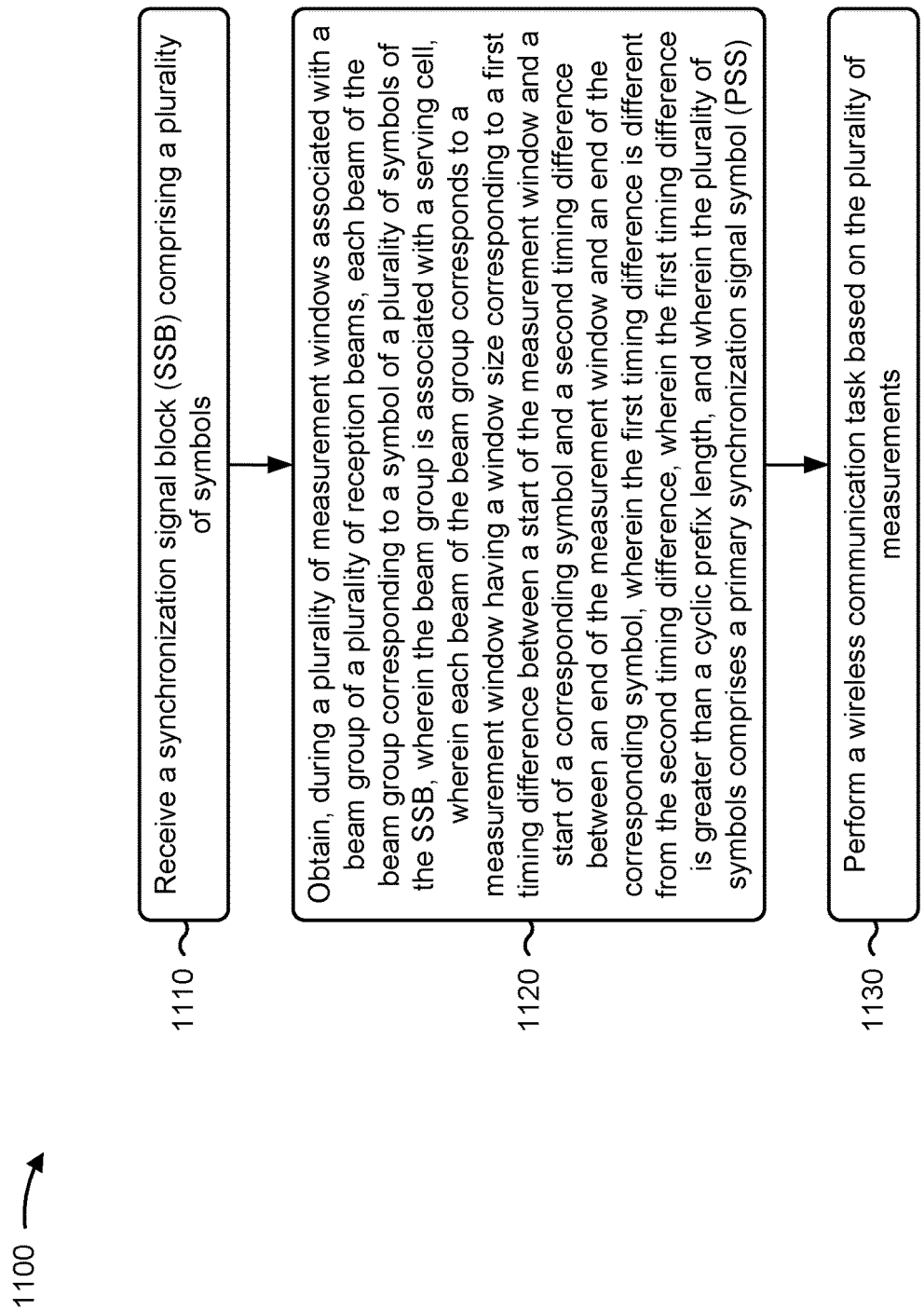
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 502) performs operations associated with obtaining a plurality of measurements associated with a plurality of symbols of an SSB.

As shown in FIG. 11, in some aspects, process 1100 may include receiving an SSB comprising a plurality of symbols (block 1110). For example, the UE (e.g., using communication manager 1208 and/or reception component 1202, depicted in FIG. 12) may receive an SSB comprising a plurality of symbols, as described above.

As further shown in FIG. 11, in some aspects, process 1100 may include obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS (block 1120). For example, the UE (e.g., using communication manager 1208 and/or reception component 1202, depicted in FIG. 12) may obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS, as described above.

As further shown in FIG. 11, in some aspects, process 1100 may include performing a wireless communication task based on the plurality of measurements (block 1130). For example, the UE (e.g., using communication manager 1208, reception component 1202, and/or transmission component 1204, depicted in FIG. 12) may perform a wireless communication task based on the plurality of measurements, as described above.

Process 1100 may include additional aspects, such as any single aspect or any combination of aspects described below and/or in connection with one or more other processes described elsewhere herein.

In a first aspect, obtaining the plurality of measurements comprises obtaining at least two measurements associated with the SSB. In a second aspect, alone or in combination with the first aspect, the plurality of measurements correspond to the PSS and an SSS symbol or a second PBCH symbol of a first PBCH symbol and the second PBCH symbol. In a third aspect, alone or in combination with one or more of the first and second aspects, performing the wireless communication task comprises performing an SSB-based beam refinement operation.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
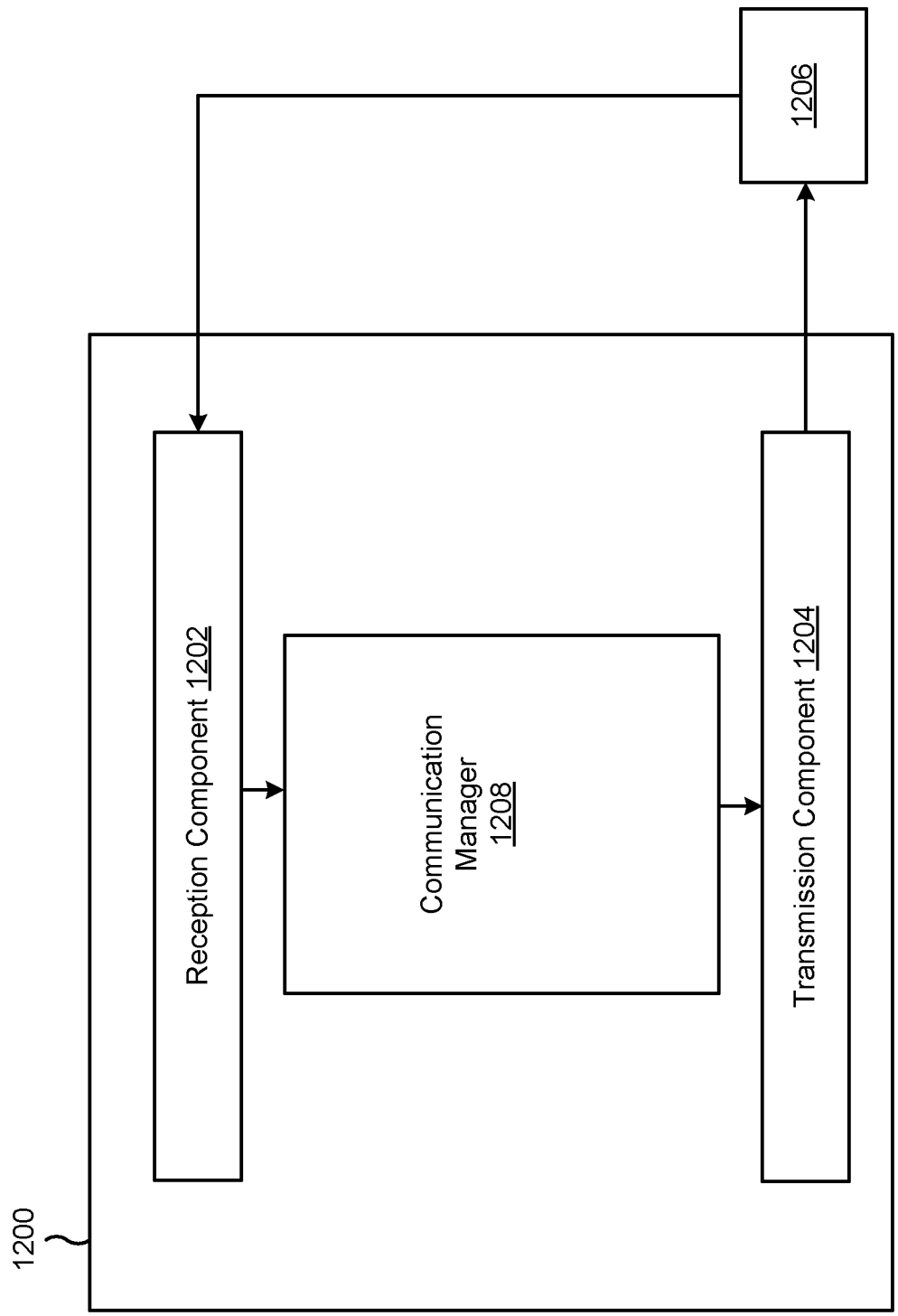
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, obtaining, and/or performing may include various processing system components, such as a receive processor, a transmit processor, a controller/processor, a memory, or a combination thereof, of the UE described above in connection with FIG. 2.

The communication manager 1208 and/or the reception component 1202 may receive an SSB comprising a plurality of symbols. In some aspects, the communication manager 1208 may include one or more antennas, a modem, a controller/processor, a memory, or a combination thereof, of the UE described in connection with FIG. 2. In some aspects, the communication manager 1208 may include the reception component 1202 and/or the transmission component 1204. In some aspects, the communication manager 1208 may be, be similar to, include, or be included in, the communication manager 140 depicted in FIGS. 1 and 2.

The communication manager 1208 and/or the reception component 1202 may obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB. The communication manager 1208, the reception component 1202, and/or the transmission component 1204 may perform a wireless communication task based on the plurality of measurements.

The communication manager 1208 and/or the reception component 1202 may receive an SSB comprising a plurality of symbols. The communication manager 1208 and/or the reception component 1202 may obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a PSS. The communication manager 1208, the reception component 1202, and/or the transmission component 1204 may perform a wireless communication task based on the plurality of measurements.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
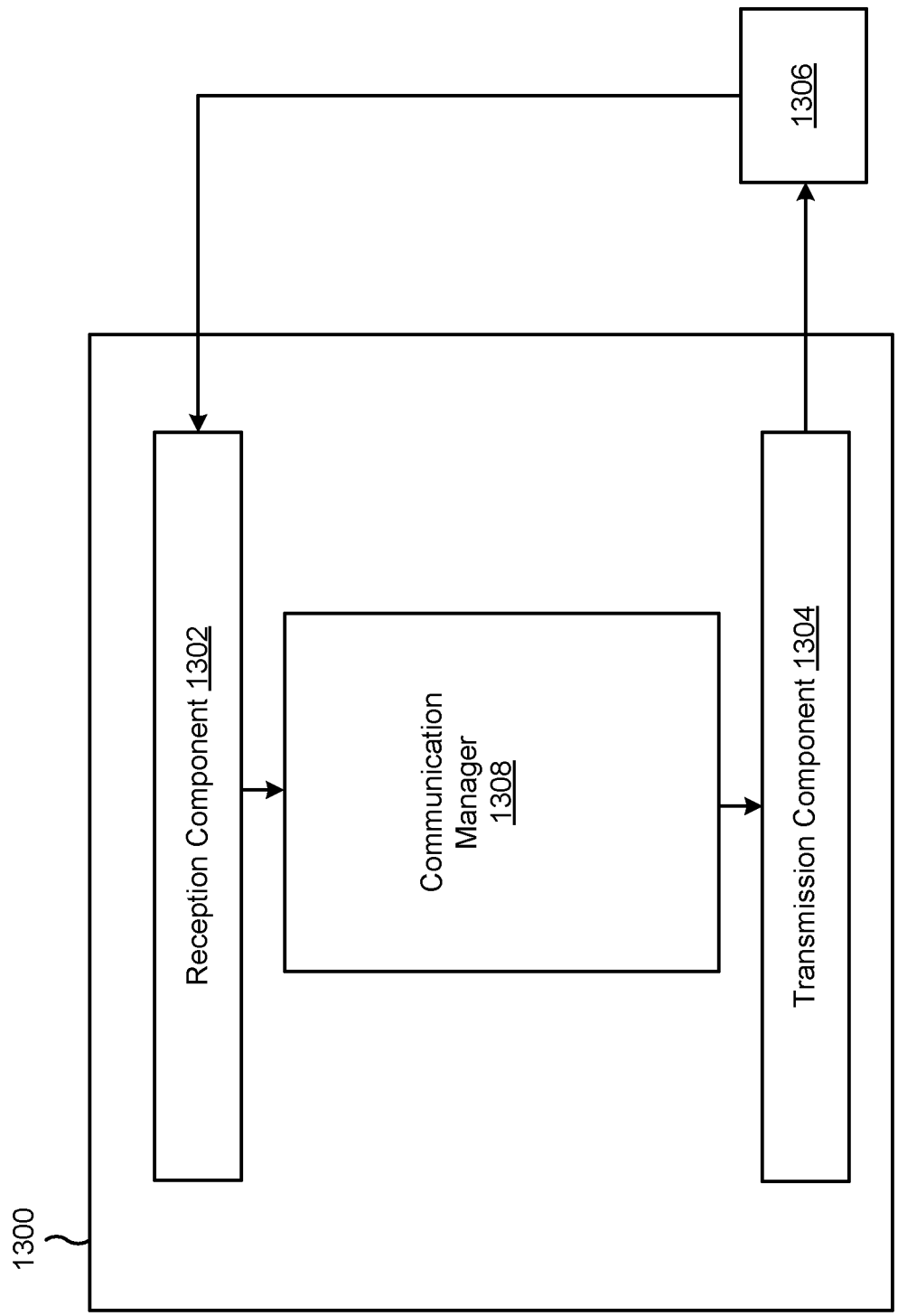
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308.

In some aspects, the apparatus 1300 may be configured to perform one or more operations described herein in connection with FIGS. 5-9. Additionally, or alternatively, the apparatus 1300 may be configured to perform one or more processes. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, obtaining, outputting, and/or transmitting may include various processing system components, such as a receive processor, a transmit processor, a controller/processor, a memory, or a combination thereof, of the network node described above in connection with FIG. 2.

In some aspects, the communication manager 1308, the reception component 1302, and/or the transmission component 1304 may communicate with one or more UEs. In some aspects, the communication manager 1308 may include one or more antennas, a modem, a controller/processor, a memory, or a combination thereof, of the network node described in connection with FIG. 2. In some aspects, the communication manager 1308 may include the reception component 1302 and/or the transmission component 1304. In some aspects, the communication manager 1308 may be, be similar to, include, or be included in, the communication manager 150 depicted in FIGS. 1 and 2. In some aspects, the communication manager 1308 and/or the transmission component 1304 may transmit one or more SSBs, configuration information, and/or other signals.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an apparatus at a user equipment (UE), comprising: receiving a synchronization signal block (SSB) comprising a plurality of symbols; obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB; and performing a wireless communication task based on the plurality of measurements.

Aspect 2: The method of Aspect 1, wherein the first set of beams corresponds to a first measurement window size and wherein the second set of beams corresponds to a second measurement window size.

Aspect 3: The method of Aspect 2, wherein the first measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is no greater than one half of a cyclic prefix length.

Aspect 4: The method of either of Aspects 2 or 3, wherein the second measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is greater than one half of a cyclic prefix (CP) length and less than a CP length.

Aspect 5: The method of any of Aspects 2-4, wherein obtaining the plurality of measurements comprises obtaining three measurements associated with the SSB, wherein each measurement of the three measurements corresponds to a beam of the beam group.

Aspect 6: The method of any of Aspects 2-5, wherein the plurality of measurements correspond to at least three of a primary synchronization signal symbol, a first physical broadcast channel (PBCH) symbol, a secondary synchronization signal symbol, or a second PBCH symbol.

Aspect 7: The method of any of Aspects 2-6, wherein the beam group comprises a third set of beams and a fourth set of beams, wherein the third set of beams corresponds to a third measurement window size and wherein the fourth set of beams corresponds to a fourth measurement window size.

Aspect 8: The method of Aspect 7, wherein the third measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is less than one half of a cyclic prefix length.

Aspect 9: The method of either of Aspects 7 or 8, wherein the fourth measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is greater than one half of a cyclic prefix length.

Aspect 10: The method of any of Aspects 7-9, wherein obtaining the plurality of measurements comprises obtaining at least two measurements associated with the SSB, wherein each of the at least two measurements corresponds to a beam of the beam group.

Aspect 11: The method of any of Aspects 7-10, wherein the plurality of measurements correspond to at least two of a first physical broadcast channel (PBCH) symbol, a secondary synchronization signal symbol, or a second PBCH symbol.

Aspect 12: The method of any of Aspects 1-11, wherein performing the wireless communication task comprises performing an SSB-based beam refinement operation.

Aspect 13: A method of wireless communication performed by an apparatus at a user equipment (UE), comprising: receiving a synchronization signal block (SSB) comprising a plurality of symbols; obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a primary synchronization signal symbol (PSS); and performing a wireless communication task based on the plurality of measurements.

Aspect 14: The method of Aspect 13, wherein obtaining the plurality of measurements comprises obtaining at least two measurements associated with the SSB.

Aspect 15: The method of either of Aspects 13 or 14, wherein the plurality of measurements correspond to the PSS and a secondary synchronization signal symbol or a second physical broadcast channel (PBCH) symbol of a first PBCH symbol and the second PBCH symbol.

Aspect 16: The method of any of Aspects 13-15, wherein performing the wireless communication task comprises performing an SSB-based beam refinement operation.

Aspect 17: An apparatus for wireless communication at a device, comprising a processor; memory coupled with the processor; and instructions stored in the memory and executable by the processor to cause the apparatus to perform the method of one or more of Aspects 1-12.

Aspect 18: A device for wireless communication, comprising a memory and one or more processors coupled to the memory, the one or more processors configured to perform the method of one or more of Aspects 1-12.

Aspect 19: An apparatus for wireless communication, comprising at least one means for performing the method of one or more of Aspects 1-12.

Aspect 20: A non-transitory computer-readable medium storing code for wireless communication, the code comprising instructions executable by a processor to perform the method of one or more of Aspects 1-12.

Aspect 21: A non-transitory computer-readable medium storing a set of instructions for wireless communication, the set of instructions comprising one or more instructions that, when executed by one or more processors of a device, cause the device to perform the method of one or more of Aspects 1-12.

Aspect 22: An apparatus for wireless communication at a device, comprising a processor; memory coupled with the processor; and instructions stored in the memory and executable by the processor to cause the apparatus to perform the method of one or more of Aspects 13-16.

Aspect 23: A device for wireless communication, comprising a memory and one or more processors coupled to the memory, the one or more processors configured to perform the method of one or more of Aspects 13-16.

Aspect 24: An apparatus for wireless communication, comprising at least one means for performing the method of one or more of Aspects 13-16.

Aspect 25: A non-transitory computer-readable medium storing code for wireless communication, the code comprising instructions executable by a processor to perform the method of one or more of Aspects 13-16.

Aspect 26: A non-transitory computer-readable medium storing a set of instructions for wireless communication, the set of instructions comprising one or more instructions that, when executed by one or more processors of a device, cause the device to perform the method of one or more of Aspects 13-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A apparatus for wireless communication at a user equipment, comprising:
a memory; and
one or more processors, coupled to the memory, configured to:
receive a synchronization signal block (SSB) comprising a plurality of symbols;
obtain, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB; and
perform a wireless communication task based on the plurality of measurements.

2. The apparatus of claim 1, wherein the first set of beams corresponds to a first measurement window size and wherein the second set of beams corresponds to a second measurement window size.

3. The apparatus of claim 2, wherein the first measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is no greater than one half of a cyclic prefix length.

4. The apparatus of claim 2, wherein the second measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is greater than one half of a cyclic prefix (CP) length and less than a CP length.

5. The apparatus of claim 2, wherein the one or more processors, to obtain the plurality of measurements, are configured to obtain three measurements associated with the SSB, wherein each measurement of the three measurements corresponds to a beam of the beam group.

6. The apparatus of claim 2, wherein the plurality of measurements correspond to at least three of a primary synchronization signal symbol, a first physical broadcast channel (PBCH) symbol, a secondary synchronization signal symbol, or a second PBCH symbol.

7. The apparatus of claim 2, wherein the beam group comprises a third set of beams and a fourth set of beams, wherein the third set of beams corresponds to a third measurement window size and wherein the fourth set of beams corresponds to a fourth measurement window size.

8. The apparatus of claim 7, wherein the third measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is less than one half of a cyclic prefix length.

9. The apparatus of claim 7, wherein the fourth measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is greater than one half of a cyclic prefix length.

10. The apparatus of claim 7, wherein the one or more processors, to obtain the plurality of measurements, are configured to obtain at least two measurements associated with the SSB, wherein each of the at least two measurements corresponds to a beam of the beam group.

11. The apparatus of claim 7, wherein the plurality of measurements correspond to at least two of a first physical broadcast channel (PBCH) symbol, a secondary synchronization signal symbol, or a second PBCH symbol.

12. The apparatus of claim 1, wherein the one or more processors, to perform the wireless communication task, are configured to perform an SSB-based beam refinement operation.

13. A apparatus for wireless communication at a user equipment, comprising:
a memory; and
one or more processors, coupled to the memory, configured to:
receive a synchronization signal block (SSB) comprising a plurality of symbols;
obtain, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a primary synchronization signal symbol (PSS); and
perform a wireless communication task based on the plurality of measurements.

14. The apparatus of claim 13, wherein the plurality of measurements correspond to the PSS and a secondary synchronization signal symbol or a second physical broadcast channel (PBCH) symbol of a first PBCH symbol and the second PBCH symbol.

15. The apparatus of claim 13, wherein the one or more processors, to perform the wireless communication task, are configured to perform an SSB-based beam refinement operation.

16. A method of wireless communication performed by an apparatus at a user equipment, comprising:
receiving a synchronization signal block (SSB) comprising a plurality of symbols;
obtaining, during a plurality of measurement windows, a plurality of measurements associated with a beam group of a plurality of reception beams, each beam of the plurality of reception beams corresponding to a symbol of a plurality of symbols of the SSB, wherein the beam group is associated with a serving cell and comprises a first set of beams and a second set of beams, wherein each beam of the beam group corresponds to a measurement window having a window size that is less than a size of a corresponding symbol of the plurality of symbols of the SSB; and performing a wireless communication task based on the plurality of measurements.

17. The method of claim 16, wherein the first set of beams corresponds to a first measurement window size and wherein the second set of beams corresponds to a second measurement window size.

18. The method of claim 17, wherein the first measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is no greater than one half of a cyclic prefix length.

19. The method of claim 17, wherein the second measurement window size corresponds to a first timing difference between a start of a measurement window and a start of a corresponding symbol and a second timing difference between an end of the measurement window and an end of the corresponding symbol, wherein the first timing difference is equal to the second timing difference, and wherein the first timing difference is greater than one half of a cyclic prefix (CP) length and less than a CP length.

20. The method of claim 17, wherein obtaining the plurality of measurements comprises obtaining three measurements associated with the SSB, wherein each measurement of the three measurements corresponds to a beam of the beam group.

21. The method of claim 17, wherein the plurality of measurements correspond to at least three of a primary synchronization signal symbol, a first physical broadcast channel (PBCH) symbol, a secondary synchronization signal symbol, or a second PBCH symbol.

22. The method of claim 17, wherein the beam group comprises a third set of beams and a fourth set of beams, wherein the third set of beams corresponds to a third measurement window size and wherein the fourth set of beams corresponds to a fourth measurement window size.

23. The method of claim 22, wherein the third measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is less than one half of a cyclic prefix length.

24. The method of claim 22, wherein the fourth measurement window size corresponds to a first timing difference between a start of a measurement window and a start of a corresponding symbol and a second timing difference between an end of the measurement window and an end of the corresponding symbol, wherein the first timing difference is different from the second timing difference, and wherein the first timing difference is greater than one half of a cyclic prefix length.

25. The method of claim 22, wherein obtaining the plurality of measurements comprises obtaining at least two measurements associated with the SSB, wherein each of the at least two measurements corresponds to a beam of the beam group.

26. The method of claim 22, wherein the plurality of measurements correspond to at least two of a first physical broadcast channel (PBCH) symbol, a secondary synchronization signal symbol, or a second PBCH symbol.

27. The method of claim 16, wherein performing the wireless communication task comprises performing an SSB-based beam refinement operation.

28. A method of wireless communication performed by an apparatus at a user equipment, comprising:
receiving a synchronization signal block (SSB) comprising a plurality of symbols;
obtaining, during a plurality of measurement windows associated with a beam group of a plurality of reception beams, each beam of the beam group corresponding to a symbol of a plurality of symbols of the SSB, wherein the beam group is associated with a serving cell, wherein each beam of the beam group corresponds to a measurement window having a window size corresponding to a first timing difference between a start of the measurement window and a start of a corresponding symbol and a second timing difference between an end of the measurement window and an end of the corresponding symbol, wherein the first timing difference is different from the second timing difference, wherein the first timing difference is greater than a cyclic prefix length, and wherein the plurality of symbols comprises a primary synchronization signal symbol (PSS); and
performing a wireless communication task based on the plurality of measurements.

29. The method of claim 28, wherein the plurality of measurements correspond to the PSS and a secondary synchronization signal symbol or a second physical broadcast channel (PBCH) symbol of a first PBCH symbol and the second PBCH symbol.

30. The method of claim 28, wherein performing the wireless communication task comprises performing an SSB-based beam refinement operation.

* * * * *